UNITED STATES PATENT OFFICE.

KARL ELBEL, OF BIEBRICH, GERMANY, ASSIGNOR TO THE FIRM OF KALLE AND COMPANY, AKTIENGESELLSCHAFT, OF BIEBRICH, GERMANY.

ZINC AZONAPHTHOL DYE AND PROCESS OF MAKING SAME.

No. 807,422.  Specification of Letters Patent.  Patented Dec. 12, 1905.

Application filed September 15, 1905. Serial No. 278,671.

*To all whom it may concern:*

Be it known that I, KARL ELBEL, a subject of the King of Prussia, German Emperor, residing at Biebrich, Germany, have invented certain new and useful Improvements in the Manufacture of New Zinc Compounds, of which the following is a specification.

My invention relates in its final purpose to the manufacture of zinc compounds of the 2-oxy-sulfonaphthalene-1-azo-beta-naphthol.

If the nitrites of alkali metals and at least an equivalent amount of zinc salts (such as zinc sulfate or zinc chlorid) be allowed to act on 1-amido-2-naphtholsulfonic acids in very concentrated aqueous solution or in aqueous suspension, preferably in presence of a small amount of zinc hydroxid, the zinc salts of the diazo-oxid-sulfonic acids are obtained. If, for instance, the 1-amido-2-naphthol-4-sulfonic acid be taken as the initial product, the following compound is obtained:

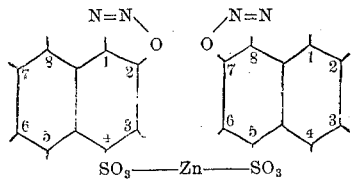

This zinc salt can be recrystallized from water in needles having a bronze-like brilliancy. The diazo-oxid zinc salts obtained from the other 1-amido-2-naphtholsulfonic acid have a corresponding composition. The process for their preparation proceeds very smoothly, oxidation of the 1-amido-2-naphtholsulfonic acids not being noticeable. If the diazotized products be brought together, preferably at somewhat-elevated temperatures, with an alkaline beta-naphthol solution, zinc compounds of the 2-oxy-sulfonaphthalene 1-azo-beta-naphthols are produced, which may be used for dyeing fast blue-blacks on wool. The shades obtained on wool direct in the acid-bath are red to violet; but on subsequent treatment with bichromate they are converted into blue-blacks which are of an extraordinary fastness in all respects. These zinc compounds are soluble in water and in aqueous soda solution with a bluish-red color.

The two following examples will further explain the nature of this invention, these examples illustrating the preparation of the diazo derivatives and their conversion into dyes; but I do not limit myself to the proportions given in these examples.

Example 1: Forty-eight kilograms of 1-amido-2-naphthol-4-sulfonic acid (one hundred per cent.) obtained by the reduction of 1-nitroso-2-naphthol by means of sodium bisulfite and hydrochloric acid and filtering and washing with water are mixed into a thick paste with some water and a solution of thirty-three kilograms of zinc sulfate in seventy kilograms of water from which solution a small quantity of zinc hydroxid has been precipitated by the addition of a small amount (say three kilograms) of aqueous ammonia. To this mixture (while well stirring) is added a concentrated solution of fourteen kilograms of sodium nitrite in water. The mass begins to turn yellow and a considerable quantity of diazo-naphthol sulfonic acid is present, which is ascertained by testing with an alkaline solution of resorcinol. After heating for two hours at a temperature of about 40° centigrade a test sample acidified with acetic acid will be found not to evolve gas, and this shows that the reaction is completed. If the diazo compound is to be isolated, it can be precipitated by acidifying the reaction mass slightly by means of acetic acid, for instance, the precipitated diazo compound being filtered off and washed with water. The analysis of the purified product indicates approximately the composition of the zinc salt of the 1-diazo-2-naphthol-4-sulfonic acid. The diazo compound combines easily with beta-naphthol-sodium with certain beta-naphtholsulfonic acids, (for instance the 2-naphthol-7-sulfonic acid,) with certain dioxynaphthalenes, and with the amidonaphtholsulfonic acid S and the like. For the purpose of preparing the dyes it is not necessary to isolate the diazo compounds, the reaction mass obtained as hereinbefore explained being usable directly for the purpose, all that is required after acidifying with acetic acid being to render the reaction mass alkaline by the addition, for instance, of sixty kilograms of soda-ash and to add a concentrated solution of beta-naphthol-sodium (containing thirty kilograms of beta-naphthol) which has been heated to from 60° to 80° centigrade. The mass is kept heated at from 40° to 45° centigrade until the combination is complete, which is usually the case in about eight hours. It can be ascertained by testing with resorcinol. For the purpose of isolating the dye the reaction mass (which is highly concentrated, its volume being only about equal to seven hundred liters) is diluted with a salt solution to about two thousand liters and is then filtered and pressed. The product thus obtained is a zinc compound of 2-oxy-4-sulfonaphthalene-1-azo-beta-naphthol and can be used directly for dyeing in an acid-bath. The dyeings on being subsequently treated with bichromate are fine blue-black shades of great fastness. In a similar manner 1-amido-2-naphthol-6-sulfonic acid and other isomeric sulfonic acids of 1-amido-2-naphthol can be diazotized and used for the production of dyes.

Example 2: Eighty-one kilograms of 1 amido-2-naphthol-3-6-disulfonic acid (eighty-five per cent. purity) are stirred in two hundred and fifty liters of water and mixed with a solution of fifty kilograms of zinc sulfate in seventy-five liters of water from which solution some small quantity of zinc hydroxid has been previously precipitated by the addition of fifteen liters of an aqueous solution of ammonia. After the mixture has been well stirred a concentrated aqueous solution of fourteen kilograms of sodium nitrite is added to it, and the mass is stirred at the ordinary temperature for about ten hours, after which it is mixed with twenty-five liters of fifty-per-cent. acetic acid. After a while the reaction mixture is rendered alkaline by gradually running into it a caustic soda-lye having a strength of 40° Baumé. The mass is then mixed with a hot solution of thirty-five kilograms of beta-naphthol and thirty kilograms of caustic lye of 40° Baumé in a little water. Thereupon the mass is heated to a temperature of from 40° to 50° centigrade and stirred for about ten hours at that temperature. The combination is then completed, and the zinc compound is precipitated by means of a solution of common salt, filtered, pressed, and dried, and it can be used for direct dyeing. The shade obtained after treatment with bichromate is more greenish than that produced with the color of the previous example.

What I claim is—

1. The herein-described process for the manufacture of zinc compounds of 2-oxy-sulfo-naphthalene-1-azo-beta-naphthols, which consists in treating 1-amido-2-naphtholsulfonic acids in concentrated aqueous solution or suspension with alkali nitrite and at least an equivalent amount of zinc sulfate and bringing the so-obtained product into reaction with beta-naphthol in concentrated alkaline solution.

2. The new zinc compounds of 2-oxy-sulfo-naphthalene-1-azo-beta-naphthols obtainable by treating 1-amido-2-naphtholsulfonic acids in concentrated aqueous solution or suspension with alkali nitrite and at least an equivalent amount of zinc sulfate and combining the product of this reaction with beta-naphthol, soluble in water and aqueous soda solution with bluish-red color, dyeing wool in an acid-bath bluish-red to violet shades, which are turned into blue blacks by a subsequent treatment with bichromate.

3. The new zinc compounds of 2-oxy-4-sulfonaphthalene-1-azo-beta-naphthol produced by treating 1-amido-2-naphthol-4-sulfonic acid with an equivalent quantity of sodium nitrite in presence of at least an equivalent quantity of zinc sulfate and combining the product of this reaction with beta-naphthol, being a dark-brown powder, soluble in water and aqueous soda solution with bluish-red color dyeing wool in an acid-bath a bluish-red shade which is turned into a fast blue black by a subsequent treatment with bichromate.

In testimony whereof I have signed my name to this specification in the presence of two subscribing witnesses.

KARL ELBEL.

Witnesses:
IGNAR ROSENBERG,
JEAN GRUND.